United States Patent [19]
Schlueter, Jr. et al.

[11] Patent Number: 6,042,917
[45] Date of Patent: Mar. 28, 2000

[54] MEMBER HAVING OFFSET SEAMS

[75] Inventors: Edward L. Schlueter, Jr., Rochester; Joseph Mammino, Penfield; Gerald M. Fletcher, Pittsford; Donald S. Stanton, Penfield; James F. Smith, Ontario; Francis C. McDowell, Webster, all of N.Y.

[73] Assignee: Xerox Corporation, Stamford, Conn.

[21] Appl. No.: 09/332,314

[22] Filed: Jun. 14, 1999

Related U.S. Application Data

[63] Continuation-in-part of application No. 08/898,235, Jul. 22, 1997, abandoned.

[51] Int. Cl.[7] .............................. B32B 3/00; G03G 13/20
[52] U.S. Cl. ......................... 428/60; 428/412; 428/421; 430/124; 156/304.5; 399/302
[58] Field of Search ........................ 428/60, 412, 421; 430/124; 156/304.5; 399/302

[56] References Cited

U.S. PATENT DOCUMENTS

| | | | |
|---|---|---|---|
| 3,728,066 | 4/1973 | Stadler et al. | 425/471 |
| 4,803,934 | 2/1989 | Gstohl | 112/121.14 |
| 5,273,799 | 12/1993 | Yu | 428/57 |
| 5,487,707 | 1/1996 | Sharf et al. | 474/253 |
| 5,525,446 | 6/1996 | Sypula et al. | 430/47 |
| 5,576,818 | 11/1996 | Badesha et al. | 355/271 |
| 5,688,355 | 11/1997 | Yu | 156/272.8 |
| 5,698,358 | 12/1997 | Yu | 430/127 |
| 5,721,032 | 2/1998 | Parker et al. | 428/57 |

FOREIGN PATENT DOCUMENTS

| | | |
|---|---|---|
| 57-9343 | 1/1982 | Japan . |
| 57-23974 | 2/1982 | Japan . |
| 2-52812 | 4/1990 | Japan . |
| 8-99737 | 4/1996 | Japan . |
| 11-73033 | 3/1999 | Japan . |

*Primary Examiner*—Mark Chapman
*Attorney, Agent, or Firm*—Zosan S. Soong

[57] ABSTRACT

A member composed of a base layer having a seam and a top layer having a seam, an adhesive layer between the base layer and the top layer, wherein the base layer seam is discontinuously offset from the top layer seam.

15 Claims, 5 Drawing Sheets

MEMBER HAVING OFFSET SEAMS

CROSS REFERENCE TO RELATED APPLICATIONS

This application is a continuation-in-part application of U.S. application Ser. No. 08/898,235 now abandoned, the disclosure of which is totally incorporated herein by reference.

FIELD OF THE INVENTION

This invention relates to a member in the form for example of an endless belt having discontinuously offset seams. Preferably, the member is an intermediate toner image transfer member for electrostatographic printing apparatus.

BACKGROUND OF THE INVENTION

FIGS. 1 and 2 show a conventional member 110' composed of seamed top layer 3', seamed intermediate layer 7', and seamed base layer 5'. The seam 9' extends continuously through all the layers (3', 7', and 5'). Continuous seams like those illustrated in FIGS. 1 and 2 are problematic since they require a continuous geometric cut to separate the different layers for seaming. This cutting needs to be accurate and is typically confined to a small seam area of less than about 0.25 inch. This type of seaming creates several problems. The first problem is that the cutting reduces the overall thickness of each layer and therefore creates a weak spot in each layer. When cutting and seaming in this small area, mechanical and electrical distortions are confined to the small thickness layers and the small width of the seam in the process direction. These mechanical and electrical distortions confined to this small area result in image quality degradation when performing color print processing. Thus, there is a need, which the present invention addresses, for a seamed member having enhanced mechanical strength for resisting tearing at the seams. In the present invention, the seam of each individual layer is preferably substantially separated to minimize the overall mechanical and electrical disturbances.

Where seamed members are intermediate toner transfer members, they enable a higher reproduction rate for color images using a four color system as compared to those imaging apparatuses without intermediate transfer members. Furthermore, registration of the final color toner image is improved. Although there are a number of intermediate transfer members employed in imaging apparatuses, there is still a need for intermediate transfer members with improved mechanical strength and electrical properties which enable generation of full color images with high color fidelity.

Conventional belts are described in the following:

Japanese Utility Model Laid-Open Publication (Kokai) No. Hei 2-52812;

Japanese Patent Laid-Open Publication (Kokai) No. Sho 57-23974;

Japanese Patent Laid-Open Publication (Kokai) No. Sho 57-9343;

Japanese Patent Laid-Open Publication (Kokai) No. Hei 8-99737; and

U.S. Pat. No. 5,721,032.

Other conventional belts are disclosed in Badesha et al., U.S. Pat. No. 5,576,818; Yu, U.S. Pat. No. 5,698,358; Yu et al., U.S. Pat. No. 5,273,799; Yu, U.S. Pat. No. 5,688,355; Stadler et al., U.S. Pat. No. 3,728,066; Gstohl, U.S. Pat. No. 4,803,934; Sypula et al., U.S. Pat. No. 5,525,446; and Sharf et al., U.S. Pat. No. 5,487,707.

SUMMARY OF THE INVENTION

The present invention is accomplished in embodiments by providing a member comprising: a base layer having a seam and a top layer having a seam, an adhesive layer between the base layer and the top layer, wherein the base layer seam is discontinuously offset from the top layer seam.

In embodiments, there is also provided a member comprising:

(a) a base layer having a seam;
(b) a first adhesive layer;
(c) an intermediate layer having a seam;
(d) a second adhesive layer; and
(e) a top layer having a seam, wherein the intermediate layer seam is discontinuously offset from both the base layer seam and the top layer seam.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in different Figures refers to the same or similar feature.

DETAILED DESCRIPTION

Figure 3:
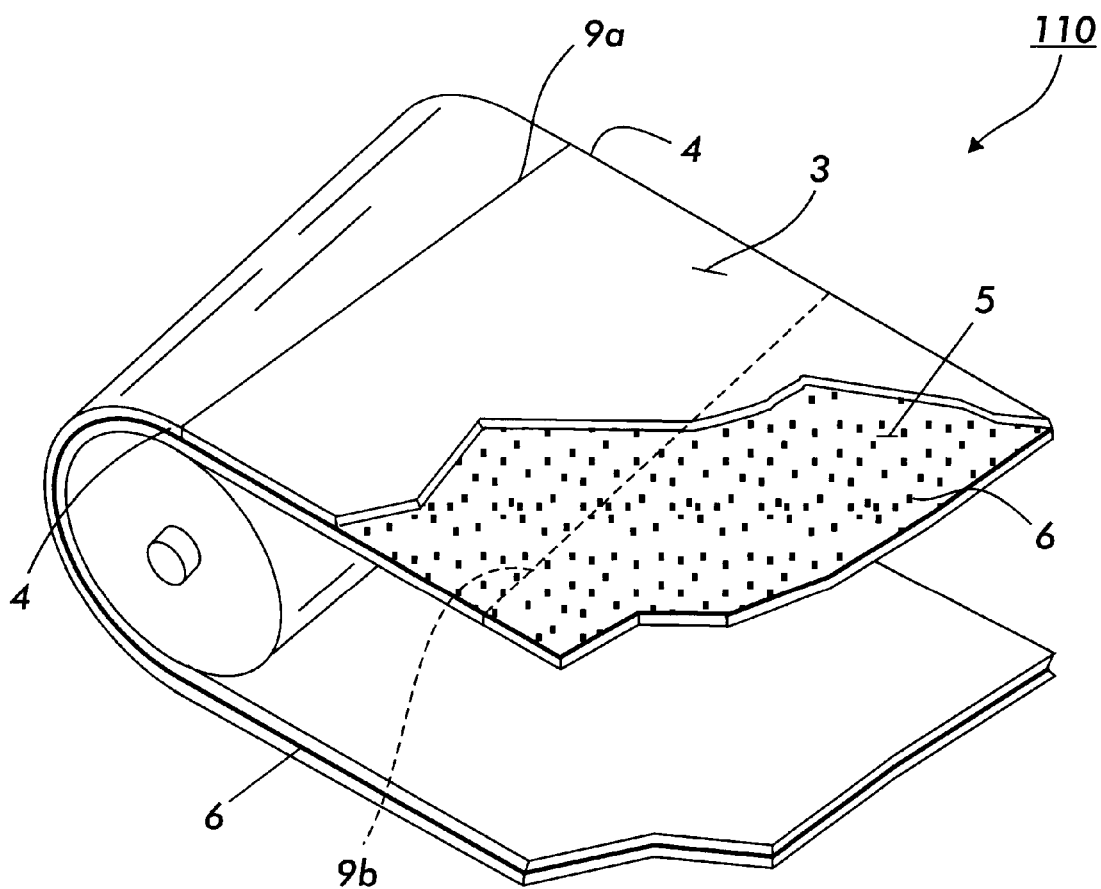
FIG. 3 is a schematic, perspective view of a first embodiment of the present seamed member.

As seen in FIG. 3, the present seamed member 110 is composed of a seamed top layer 3 and a seamed base layer 5, where the top layer preferably has only a single seam 9a and the base layer preferably has only a single seam 9b. There is an adhesive layer 6 (shown unseamed) between the base layer and the top layer. The seams (9a,9b) are discontinuously offset from each other such that the seams (9a,9b) are not aligned on top of one another. Seams 9a and 9b can be very close to one another but preferably are not closer than about 0.25 inch. Preferably, the seams 9a and 9b will reach the optimum advantage when the two seams are substantially separated at for example a distance of 180 degrees from each other (where the adhesive layer 6 is unseamed). Where the adhesive layer 6 is seamed, the an offset of 120 degrees among the adhesive layer seam and seams 9a and 9b would be the optimum. The seams can also be placed at strategic locations for timing, interdocument spacing and other processing advantages. By distributing the electrical and mechanical distortions over a large belt area, image distortion can be minimized during color print processing.

Figure 4:
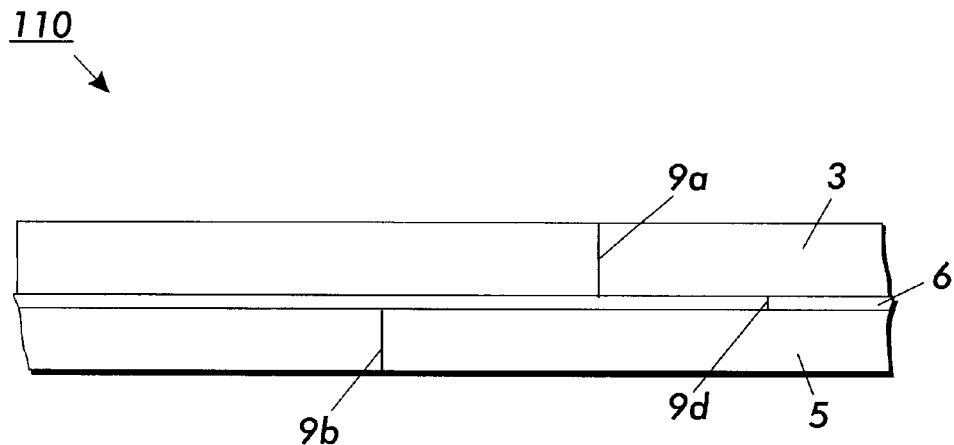
FIG. 4 is a side view along the edge of a second embodiment of the present seamed member showing the seamed region.

FIG. 4 shows member 110 composed of top layer 3 (having seam 9a), adhesive layer 6 (having seam 9d), and base layer 5 (having seam 9b). Seams (9a, 9b, 9d) are discontinuously offset from one another.

Figure 5:
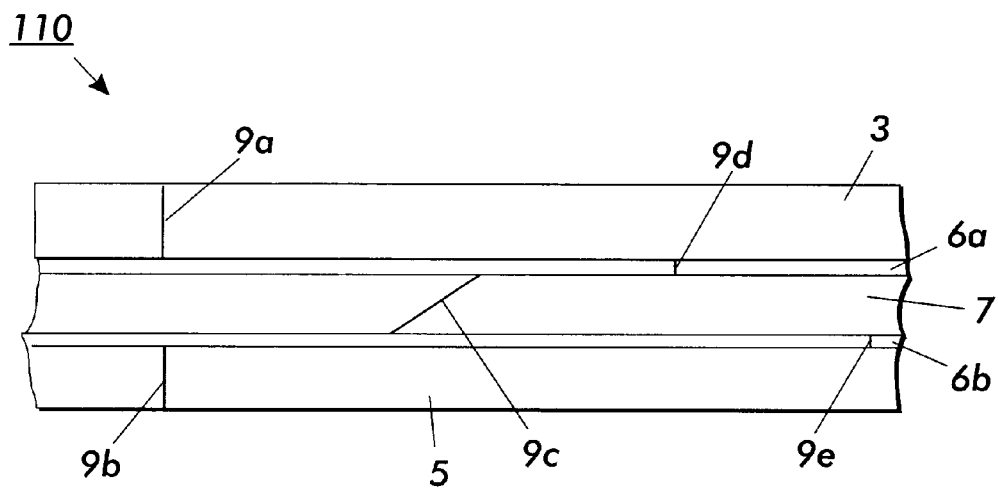
FIG. 5 is a side view along the edge of a third embodiment of the present seamed member showing the seamed region.

FIG. 5 shows member 110 composed of top layer 3 (having seam 9a), first adhesive layer 6a (having seam 9d), intermediate layer 7 (having seam 9c), second adhesive layer 6b (having seam 9e), and base layer 5 (having seam 9b). The seams (9a,9b,9c,9d,9e) are discontinuously offset from one another. In other embodiments, the first adhesive layer, the second adhesive layer, or both, are seamless.

There is absent any overlap among the seams of adjacent layers as seen in FIGS. 4–5. The seams may be perpendicular to or have an oblique angle with the two parallel edges 4 of the member. The seams may extend across the entire width of the member 110, i.e., from edge to edge. Other layers optionally may be present including for example an anti-curl layer adhered to the base layer and a middle functional layer (not an adhesive layer) that contributes to the mechanical or electrical properties of the member 110. The optional layer or layers may be seamed or unseamed. For example seam 9b can be formed and then a continuous interlayer adhesive may be applied and then seam 9a offset as described herein. If seamed, the seam of the optional layer is discontinuously offset from all the other layers.

The seams (9a,9b,9c,9d,9e) may be formed by any conventional joining method such as butt joining, puzzle cut seaming, or other geometric joining. Illustrative joining methods are described in Sharf et al., U.S. Pat. No. 5,487,707 and Mammino et al., U.S. Pat. No. 5,552,005, the disclosures of which are totally incorporated herein by reference. The seams (9a,9b,9c,9d,9e) are offset from one another by any suitable distance ranging for example from about ⅛ to about ½ the length of the member. The offset distance among the seams may be at regular or irregular intervals. The seams also may be arranged so that the seams are timed and placed so as to fall in the same or different interdocument spaces when the present member is an intermediate toner transfer member.

Figure 1:
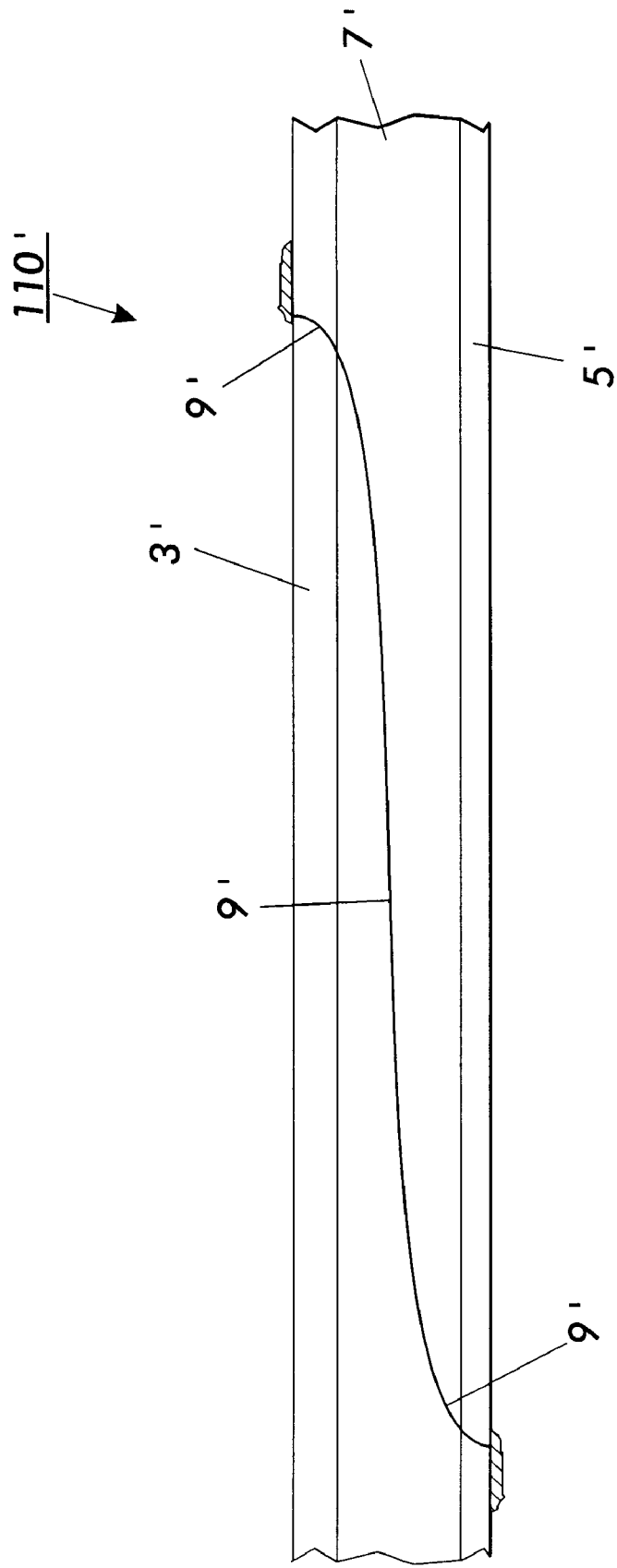
FIG. 1 is a side view along the edge of a prior art seamed member showing the seamed region.
Figure 2:
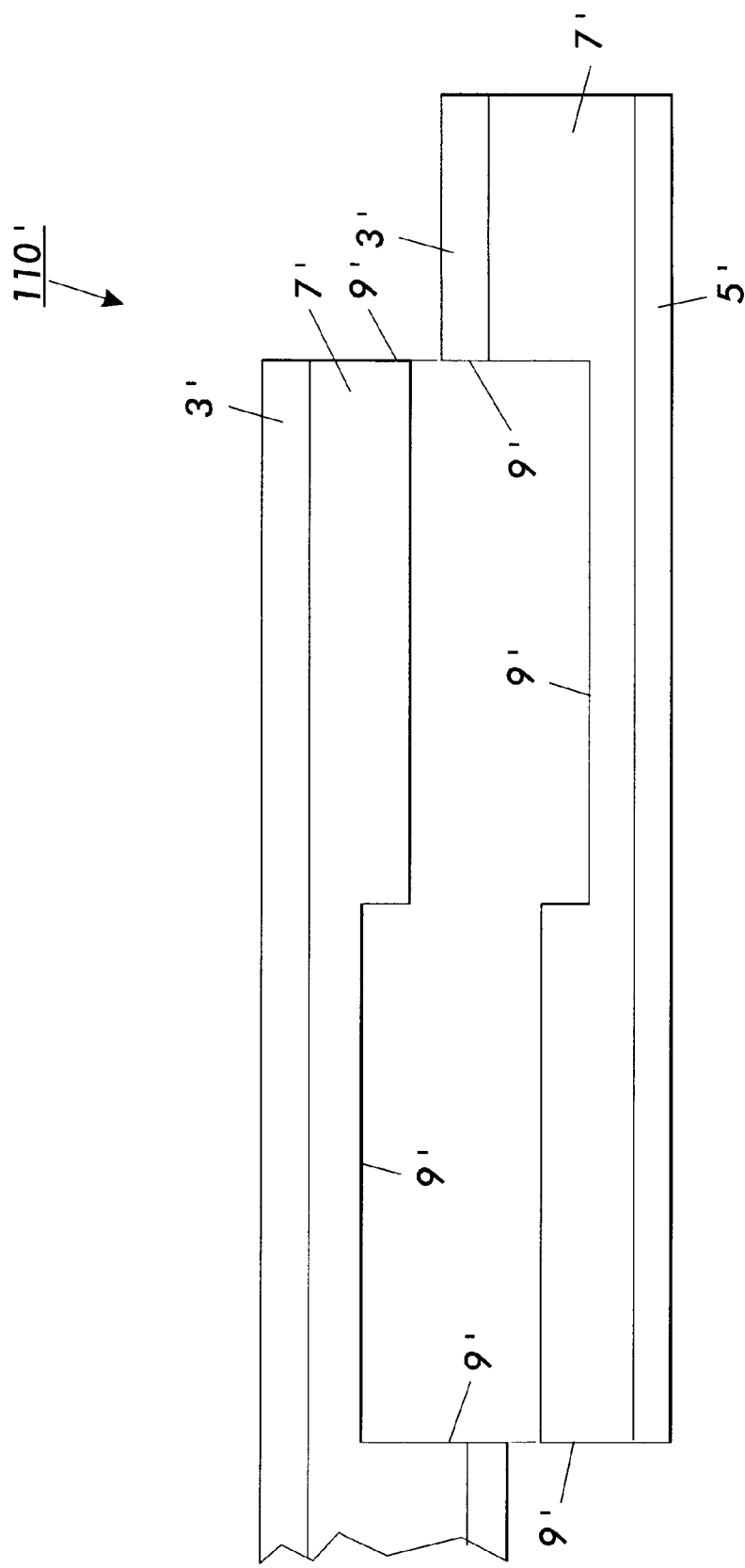
FIG. 2 is a partially exploded side view along the edge of another prior art seamed member showing the seamed region.

Thus, in the present invention, the phrase "discontinuously offset" when describing the seams refers to the staggered arrangement of seams in adjacent layers when viewed along an edge of the seamed member. Each seam is distinct and contacts only an unseamed region of adjacent layers above and below that seam. In contrast to the prior art members shown in FIGS. 1 and 2 where the seams for the layers can collectively be viewed as a single seam, the seams in the present member remain distinct and cannot collectively be viewed as a single seam. The phrase "discontinuously offset" includes those embodiments as seen in FIG. 5 where the the top layer seam 9a and the bottom layer seam 9b are aligned on top of one another, as long as the intermediate layer seam 9c is staggered from both the top layer seam 9a and the bottom layer seam 9b. Preferably, however, all the seams are staggered from each other so that no two seams are on top of one another regardless whether the seams are in adjacent layers or non-adjacent layers. The top layer, intermediate layer, and bottom layer may be considered non-adhesive layers.

By spacing the seams of different layers in different locations, several advantages occur. The material strength of each individual layer strengthens the seam area of an adjacent layer. The distribution of seams at various locations also minimizes the electrical and mechanical distortion in any one small area This results in improved image quality for color print processing.

Suitable materials for the top layer 3 and base layer 5 are described herein. Suitable materials for the intermediate layer 7 include for example a fluoroelastomer, particularly from the class of copolymers and terpolymers of vinylidenefluoride hexafluoropropylene and tetrafluoroethylene that are available under the VITON™ tradename such as VITON™ A and VITON-™ GF. Suitable materials for intermediate layer 7 are disclosed in Badesha et al., U.S. Pat. No. 5,576,818, the disclosure of which is totally incorporated herein by reference.

The intermediate layer 7 may be a conformable resistive layer including a polymeric material (such as a fluoroelastomer) and electrically conductive particles. The conformability is required to have adequate fix level of the toner image. The electrical resistivity is required for the electrostatic transfer of the toner image from the image receptor to the intermediate toner transfer belt and from the belt to the paper. The electrical resistivity of the intermediate layer 7 ranges for example from about $10^7$ to about $10^{11}$ ohm cm.

The intermediate layer has a thickness ranging for example from about 0.5 to about 50 mils, preferably from about 2 to about 10 mils, and more preferably about 5 mils.

The present member will now be described in the preferred embodiment of an intermediate toner transfer member. However, the present member can be employed in any suitable manner where a seamed member can be used. For example, the present member can be an imaging member such as a photoreceptor (e.g., belt photoreceptor), a conveyor belt, a timing belt, an intermediate toner image transfer member, a development belt, a fuser belt, a transfix belt, a roller, and a flat sheet. The present member can be in the form of an endless belt, roll or scroll.

The present intermediate transfer member may include a number of desirable characteristics which render it suitable for electrostatic transfers of toner images. For example, the intermediate transfer member may contain filler particles that tailor the mechanical or electrical properties of the transfer member. Electrical property regulating particles may be disposed in any or all of the layers described herein such as only the base layer, both the base layer and the top layer, or the base layer, the intermediate layer, and the top layer. The intermediate transfer member has a low surface energy for good toner release ranging for example from about 17 to about 37 dyn/cm, preferably from about 17 to about 27 dyn/cm. Thus, in embodiments, the top layer may be considered a toner release layer. The difference in thickness between the seamed and unseamed portion of each seamed layer is preferably less than about 100 microns. Consequently, in embodiments, the difference in thickness between the top layer seam and the unseamed portion of the top layer is less than about 100 microns and the difference in thickness between the base layer seam and the unseamed portion of the base layer is less than about 100 microns. Furthermore, the intermediate transfer member in the unseamed regions may have a smooth, untextured surface.

By discontinuously offsetting the seams, the present intermediate transfer member may exhibit a more uniform thickness along the length of the transfer member, which reduces the chance of disturbing the toner image during cycling of the transfer member, and increased seam strength, which improves the life of the transfer member.

In embodiments of the present invention, the intermediate transfer member is composed of two layers bonded together by an adhesive layer. The top layer has the proper electrical properties for charge dissipation which is necessary for toner image transfer. The base layer may be resistive but enables charge to be conducted to ground without presenting a significant ground plane to the top layer or charge can be conducted to a source of applied potential. The base layer also may be conductive and at ground. If the base layer is resistive, it is preferably composed of a polycarbonate film. The polycarbonate film layer constitutes from about 25% to about 95% by weight of the intermediate transfer member, preferably from about 50% to about 90% by weight of the intermediate transfer member. The thickness of the polycarbonate film layer ranges from about 0.5 mils to about 10 mils, preferably about 1 mil to about 5 mils.

Any suitable polycarbonate may be employed to form the base layer of the intermediate transfer member. Suitable polycarbonate resins include, but are not limited to, resins having a molecular weight from about 20,000 to about 120,000, more preferably from about 50,000 to about 100,000. Examples of such polycarbonate resins employed as the base layer of the intermediate transfer member are poly(4,4'-dipropylidene-diphenylene carbonate) with a molecular weight of about 35,000 to about 40,000, available as LEXAN 145™ from General Electric Company, poly(4,4'-isopropylidene-diphenylene carbonate) with a molecular weight of about 40,000 to about 45,000 available as LEXAN 141™ from General Electric Company; a polycarbonate resin having a molecular weight of from about 50,000 to about 100,000, available as MAKROLON™ from Farben Fabricken Bayer A.G.; a polycarbonate resin having a molecular weight of from about 20,000 to about 50,000 available as MERLON™ from Mobay Chemical Company; polyether carbonates; and 4,4'-cyclohexylidene diphenyl polycarbonate. Polycarbonate polymers suitable for practicing this invention also can be made, for example, from 2,2-bis(4-hydroxyphenol)propane; 4,4'-dihydroxy-diphenyl-1,1-isobutane; 4,4'-dihydroxy-diphenyl-4,4'-heptane; 4,4'-dihydroxy-diphenyl-2,2-hexane; 4,4'-dihydroxy-triphenyl-2,2,2-ethane; 4,4'-dihydroxy diphenyl-1,1-cyclohexane; 4,4'-dihydroxy-diphenyl-beta—beta-decahydronaphthalene; 4,4'-dihydroxy-diphenyl-sulphone and the like. High heat resistant polyphthalate carbonate resins such as LEXAN 4701™ and 4501™ available from General Electric Company and the like are also suitable to form the base layer.

The polycarbonate film base layer can be extrusion molded then coated with an adhesive and a thermoplastic film forming polymer as the top layer using coating techniques known in the art Extrusion processing is briefly described herein as follows: a die tool is prepared from metal hardware with an extrusion slot that has the width and thickness dimensions of the film which is to be prepared. The polycarbonate resin is dried of moisture and compounded with fillers which can include those for conductivity modification, colorants and flow modifying processing aides. The polycarbonate plastic compound is extruded though the die tool after being melted and the extruded film is allowed to cool to below its melt temperature, forming the solid film material. Other conventional materials that can be utilized as the base layer material are PEN (polyethylene naphthalate, PPS (polysulfone), polyimide, polyamide, PES (polyethylsulfone), PEEK (polyetheretherketone), polyvinylidene fluoride, and polymethylpentene. The material is mainly chosen based on the temperature and life requirements of the system desired.

Electrical property regulating particles like carbon, for example in the form of carbon black or graphite, can be loaded in any or all of the layers to enable charge carriers to pass into the base layer from the top layer and charge to be dissipated to ground potential. Dissipation of charge to ground potential prevents charge from building up to unacceptable levels during repeated image transfer to and from the intermediate member. High electrical charge levels on the intermediate member would result in difficulty in transfer of toner images to the intermediate member and degradation of toner images. Therefore, for high toner image quality and the ability to transfer successive toner images onto each other with good registration, electrical charge must be dissipated from the surface of the intermediate member through the bulk of the intermediate member material to ground potential. This is a very reliable and efficient method for charge dissipation from the intermediate member material. Other suitable charge carriers include, but are not limited to, tin, aluminum, iron, chromium, zinc, titanium, nickel, and their oxides. Organic conductive materials such as polypyrrole and polyaniline are also suitable as electrical property regulating particles. Typically, carbon black can be employed in amounts of about 5% to about 15% by weight of the intermediate transfer member, preferably from about 5% to about 12% by weight. Aluminum, iron, chromium and their oxides can be employed in amounts of to about 24% to about 52% by weight of the intermediate transfer member, preferably from about 24% to about 35% by weight.

The top layer may be composed of for example a thermoplastic film forming polymer. The top layer ranges from about 0.5 mils to about 3 mils in thickness, preferably from about 1 mil to about 2 mils in thickness. Suitable thermoplastic resins which can be employed include, but are not limited to, polyvinyl fluoride (e.g., TEDLAR™, available from E. I. du Pont de Nemours & Co.); polyvinylidene fluoride (e.g., KYNAR 202™ available from Pennwalt Co.); polyvinyl chloride; polyethylene; polypropylene; polyethers; styrene-butadiene copolymers; polybutylenes; and the like. Other suitable thermoplastic film forming polymers include polyamides (e.g., nylon); polyesters (e.g., PE-100™ and PE-200™, available from Goodyear Tire and Rubber Company); polysulfones (e.g., P-3500™, available from Union Carbide Corp.); polysulfides; cellulosic resins; polyarylate acrylics; polyaryl sulfones; polyphenylene sulfides; polyurethanes; polyimides; epoxys; poly(amide-imides) (e.g., TORLON Polymer A1830™, available from Amoco Chemical Corporation); copolyesters (e.g., KODAR Copolyester PETG 6763™ available from Eastman Kodak Co.); polyethersulfones; polyetherimides (e.g., ULTEM™ available from General Electric Company); polyarylethers; and the like. Suitable materials for the top layer also include TEFLON™ and fluoropolymers such as a rigid fluoropolymer.

The thermoplastic film forming top layer can be prepared by extrusion processing where resin is prepared in a molten state and forced under pressure through an extrusion die tool which has the desired opening width and gap corresponding to the width and thickness of the desired extruded film. The extruded thermoplastic film is allowed to cool to near room temperature and cut to an appropriate width for the end use application. An alternative method involves forming a preform from thermoplastic resin such that it can be inserted into a cavity and expanded by air pressure to the inside dimensions of the cavity which are the final dimensions of the exterior of the desired film. Appropriate methods are well known in the art.

The top layer can include electrical property regulating particles which provide proper electrical properties for the intermediate member such as charge relaxation. Charge relaxation is dissipation of surface or internal space charge from the top layer. This is done by conduction of electrical charges from electrical property regulating materials in the top layer to a ground plane located on one side of the top layer. The conduction of charges is done either electronically or ionically to include the hopping mechanism and band gap permeation. Charge on the intermediate transfer member relaxes between transfer stations to allow effective transfer of the image from the image receiving member or photoreceptor to the intermediate transfer member.

Charge relaxation between imaging stations will generally require a volume resistivity of the top layer near $10^{12}$ ohm-cm, preferably below about $10^{12}$ ohm-cm. A resistivity above about $10^{10}$ ohm-cm is preferred for good transfer to high relative humidity conditioned papers, and it is also desired to help avoid arcing between the more conductive base layer of the transfer member and electrically weak regions on the image forming photoconductors or bias transfer members that may be used with the transfer member of the present invention. Charge relaxation is not a requirement if the dielectric thickness (top layer thickness/dielectric constant) is less than about 15 microns and if charge neutralizing devices are suitably employed in the transfer process to substantially neutralize cyclic charge buildup that can accumulate on the top layer material during the toner transfer steps. Charge neutralization via, for example, corotrons, scorotrons or conductive brush devices is well known in the art and can be used with the top layer materials that do not substantially relax charge via conduction. If the top layer resistivity is above about $10^{12}$ ohm-cm and the top layer dielectric thickness is larger than about 15 microns, charge neutralization in a multicolor imaging process becomes difficult to reliably manage and image transfer stability can degrade. Although about a 15 micron dielectric thickness can be utilized in this invention, a lower dielectric thickness from about 2–10 microns is preferred when the top layer resistivity is above about $10^{12}$ ohm-cm. If volume resistivity is below $10^{12}$ ohm-cm, charge buildup will not be a problem, and the dielectric thickness of the top layer can be as large as about 200 microns. Charge relaxation, the dielectric constant, or both properties can be suitably regulated for the top layer by electrical property regulating particles incorporated within the top layer.

These electrical property regulating particles can be incorporated within the top layer during formation of the top layer. Typical particles include, but are not limited to, barium titanate, titanium dioxide, tin oxide, calcium silicate (Wollastonite 200, available from NYCO Division of Processed Minerals, Inc., N.Y.), magnetite, ultra marine blue, cobalt aluminate blue, chrome-cobalt-aluminate, chromium oxide, metal or metal-free phthalocyanines, quinacridones, diarylide yellow pigments, iron oxide, titanium-chrome oxide, zinc oxide, cadmium sulfoselenide and the like, and mixtures thereof.

These particles can be incorporated within the top layer by any suitable technique. Typical incorporation methods include roll milling, mechanical mixing, melt mixing and the like. Generally, the amount of electrical property regulating particles added to the top layer ranges from about 10% to about 15% by weight of the intermediate transfer member, preferably from about 11% to about 12% by weight of the intermediate transfer member. The volume resistivity of the top layer of the intermediate member of the present invention is preferably above about $10^{10}$ ohm-cm to below about $10^{12}$ ohm-cm to allow electric fields to be slowly relaxed to acceptable levels by migration of electrical charges from the surface and bulk of the overcoat film to the more conductive base layer. This slower rate of relaxation of the electric field enables specific process times and speeds for image preparation providing for good image resolution. In order to use materials with a volume resistivity above about $10^{12}$ ohm-cm, the dielectric thickness of the top layer of the intermediate member preferably is selected to be sufficiently low by either decreasing the thickness of the top layer or increasing the dielectric constant. Higher dielectric constant material can be employed to allow higher thickness for the top layer. The dielectric constant of the top layer of the intermediate member of the present invention, due to either inherent properties or due to electrical property regulating particles, is preferably at least 3 units, more preferably greater than about 8 units. In particular, the dielectric constant for an intermediate member comprising titanium dioxide is preferably about 10 to about 12 units.

Each adhesive layer ranges from about 0.2 mils to about 1 mil, preferably from about 0.25 mil to about 0.5 mils. Typical adhesive layers include film-forming polymers such as acrylic adhesives such as methacrylate resins, methacrylate copolymer resins, ethyl methacrylate resins, butyl methacrylate resins and mixtures thereof as disclosed in Dupont ELVACITE™ Acrylic Resins pamphlet obtainable from E. I. du Pont de Nemours and Co. the entire disclosure of which is hereby incorporated herein by reference. Also, du Pont 68080, 68070 and 68040 acrylic blends, polyesters such as du Pont 49,000 resin (available from E. I. du Pont de Nemours & Co.), VITEL PE-100™ (available from Goodyear Rubber & Tire Co.), polyvinylbutyral polyvinylpyrrolidone, polyurethane, polymethyl methacrylate and the like can be employed. The du Pont 49,000, 68080 and VITEL PE-100™ adhesive layers are preferred because they provide reasonable adhesive strength and produce no deleterious impact on the resulting intermediate transfer member. Each adhesive layer may also contain electrical property regulating particles which are the same as or different from those contained in either the base layer or top layer of the intermediate transfer member. In embodiments, the electrical property regulating particles are present in the base layer, the adhesive layer, and the top layer. The electrical resistivity (surface or volume) of the adhesive layer corresponds to either the base layer or top layer values.

The adhesive side of the coated film layer is placed in close contact with a surface of the non-coated film layer with no air space between the films. A laminator such as a du Pont Co. HRL-24 Riston laminator (obtainable from E. I. du Pont de Nemours and Co.) can be used for this processing. Heat generated during the lamination process melts the adhesive to the non-coated film layer. The member is then cooled to room temperature to bind the two layers together.

The intermediate transfer member of the present invention in embodiments can be effectively insulating with charge relaxation times longer than hours if the sum of the dielectric thickness (thickness divided by dielectric constant) of all of the layers of the member is near or below about 15 microns and if cyclic charge deposited on the transfer member is removed by for example the use of corona neutralization devices well known in the art. However, it is preferred that the charge relaxation time be less than the dwell time that the transfer member takes to move between subsequent transfer steps in a cycling mode so that such charge neutralization devices may not be needed. Typical systems of interest will have a circumference of the transfer member less than about 100 inches, and typical process speeds will be above 1 in/sec, so a charge relaxation time of no more than about $2\times10^2$ seconds is typically desired. The lower limit of suitable charge relaxation times is theoretically unomited, and conductive materials, such as metals, can be employed as the transfer member. While not being limited by any theory, however, it is believed that the lower limit on the charge relaxation time for an intermediate transfer member in any given situation will be determined by the conductivity of the receiving substrate to which the toner image is ultimately transferred. Specifically, no shorting should occur between the intermediate transfer component and the receiving substrate around the toner piles constituting the image, since shorting would result in little or no transfer field to effect transfer from the intermediate to the receiving substrate. Typically, for transfer to paper, the charge relaxation time of the layer of the transfer member that will be in contact with the paper will preferably be above about $1 \times 10^{-3}$ seconds. Thus, the preferred range of charge relaxation times will be typically from about $1 \times 10^{-3}$ seconds to about $2 \times 10^2$ seconds. The charge relaxation time (T) of a material is generally a function of the dielectric constant (K), the volume resistivity (P) of that material, and the permittivity of free space ($E_0$, a constant equal to $8.854 \times 10^{-14}$ farads per centimeter), wherein $T=KE_0P$.

The following discussion provides a general description of the operation of If a liquid developer type electrostatographic printing machine which incorporates the instant intermediate toner transfer member. It is understood that the present intermediate transfer member also may be incorporated into a dry developer type electrostatographic printing machine.

Figure 6:
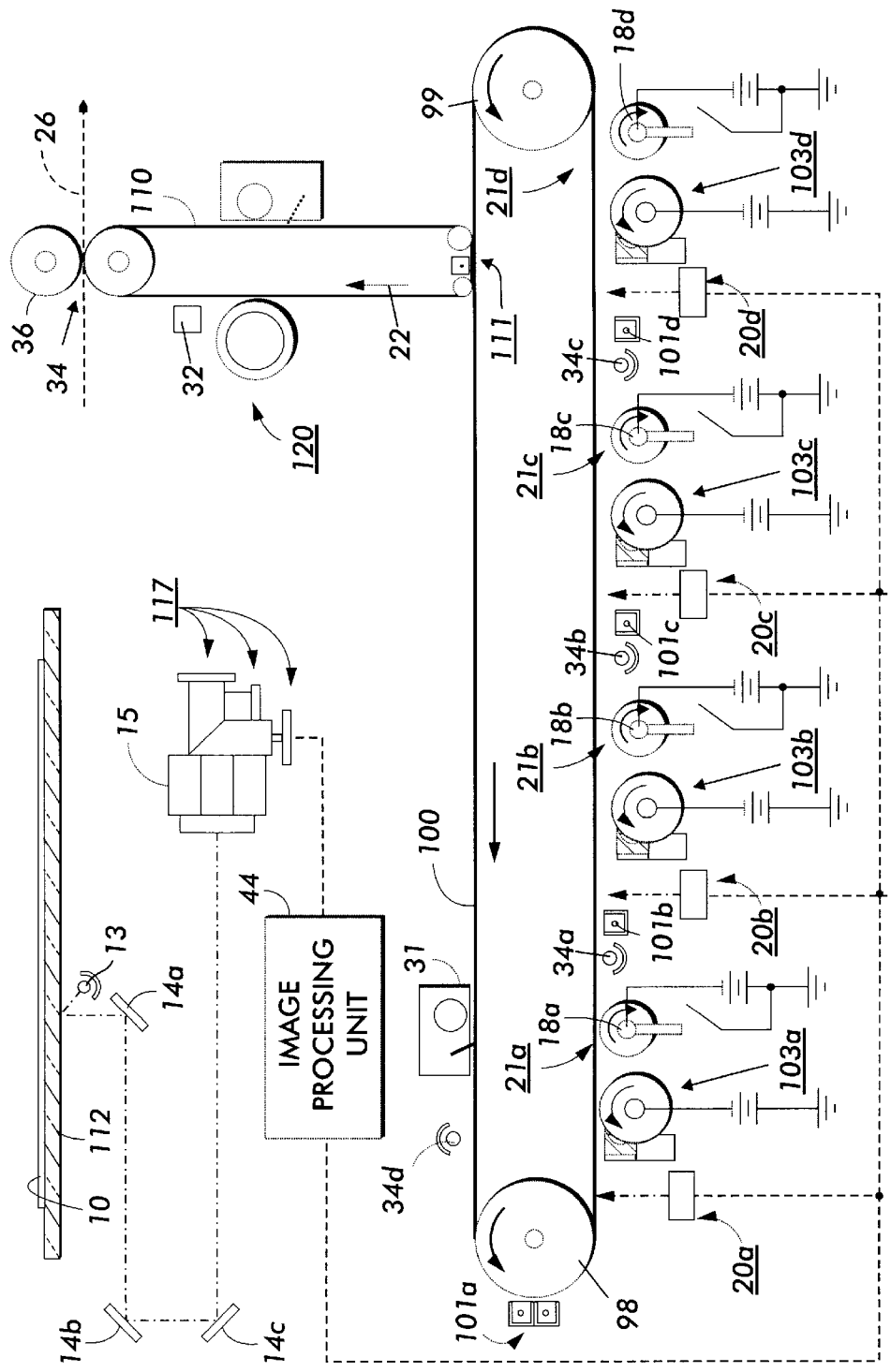
FIG. 6 is a schematic, elevational view of a color electrostatographic printing machine incorporating the present invention as an intermediate toner image transfer member.

Turning now to the FIG. 6, a photoreceptor 100 in the form of an endless belt is rotated along a curvilinear path defined by rollers 98 and 99. The photoreceptor 100 preferably includes a continuous multilayered belt including a substrate, an electrically conductive layer, an optional adhesive layer, an optional hole blocking layer, a charge generating layer, a charge transport layer, and, in some embodiments, an anti-curl backing layer. Initially, belt 100 is charged to a uniform potential at a charging station by charging unit 101*a*, which typically includes a corona generating device capable of spraying ions onto the surface of the photoreceptor 100 to produce a relatively high, substantially uniform charge thereon. Charging units 101*b*, 101*c*, and 101*d* are similar to 101*a*.

After a uniform charge is placed on the surface of the photoreceptor 100, the electrostatographic printing process proceeds by either inputting a computer generated color image into an image processing unit 44 or, for example, by placing a color input document 10 to be copied on the surface of a transparent imaging platen 112. A scanning assembly preferably comprising a high powered light source 13, mirrors 14*a*, 14*b* and 14*c*, a series of lenses (not shown), a dichroic prism 15 and a plurality of charge-coupled devices (CCDs) 117 operating in association with one another is provided, whereby light from the light source 13 is directed onto the input document 10 with the light reflected from the color document 10 being transmitted to the CCDs 117. The reflected light is separated into the three primary colors by the dichroic prism 15 such that each CCD 117 provides an analog output voltage which is proportional to the intensity of the incident light of each of the primary colors. Thereafter, the analog signal from each CCD 117 is converted into a digital signal corresponding individual picture elements or so-called pixels making up the original input document. These digital signals, which represent the blue, green, and red density signals, are inputted into the image processing unit 44 where they are converted into individual bitmaps representing the color components of each pixel (yellow (Y), cyan (C), magenta (M), and black (Bk)), the receptive values of exposure for each pixel, and the color separation therebetween. The image processing unit 44 can store bitmap information for subsequent images or can operate in a real time mode. The image processing unit 44 may also contain a shading correction unit, an undercolor removal unit (UCR), a masking unit, a dithering unit, a gray level processing unit, and other imaging processing subsystems known in the art.

The digital output signals generated by the image processing unit 44 described hereinabove are transmitted to a series of individual raster output scanners (ROSs) 20*a*, 20*b*, 20*c* and 20*d* for writing complementary color image bitmap information onto the charged photoreceptor 100 by selectively erasing charges thereon. Each ROS writes the image information in a pixel by pixel manner. It will be recognized that the present description is directed toward a Recharge, Expose, and Develop (READ) process, wherein the charged photoconductive surface of photoreceptor 100 is serially exposed to record a series of latent images thereon corresponding to the substractive color of one of the colors of the appropriately colored toner particles at a corresponding development station. Thus, the photoconductive surface is continuously recharged and re-exposed to record latent images thereon corresponding to the subtractive primary of another color of the original. This latent image is therefore serially developed with appropriately colored toner particles until all the different color toner layers are deposited in superimposed registration with one another on the photoconductive surface. It should be noted that either discharged area development (DAD) discharged portions are developed, or charged area development (CAD) wherein charged areas are developed, can be employed as will be described.

As previously noted, the present intermediate member is utilized for carrying out the development process utilizing liquid developer materials, where the liquid developer units are depicted schematically at reference numerals 103*a*, 103*b*, 103*c* and 103*d*. Each developer unit transports a different color liquid developer material into contact with the electrostatic latent image so as to develop the latent image with pigmented toner particles to create a visible image. By way of example, developer unit 103*a* transports cyan colored liquid developer material developer unit 103*b* transports magenta colored liquid developer material, developer unit 103*c* transports yellow colored liquid developer material, and developer unit 103*d* transports black colored liquid developer material. Each different color developer material comprises pigmented toner particles disseminated through a liquid carrier, wherein the toner particles are charged to a polarity opposite in polarity to the charged latent image on the photoconductive surface such that the toner particles pass by electrophoresis to the electrostatic latent image to create a visible developed image thereof. Each of the developer units 103*a*, 103*b*, 103*c* and 103*d* are substantially identical to one another.

After image development, the liquid image on the photoconductor may be conditioned to compress the image and remove some of the liquid carrier therefrom, as shown, for example, by U.S. Pat. No. 4,286,039, among various other patents. An exemplary apparatus for image conditioning is shown at reference numeral 21*a*, 21*b*, 21*c* and 21*d*, each comprising a roller (18*a*,18*b*,18*c*,18*d*) which may include a porous body and a perforated skin covering. The roller (18*a*,18*b*,18*c*,18*d*) is typically biased to a potential having a polarity which inhibits the departure of toner particles from the image on the photoreceptor 100 while compacting the toner particles of the image onto the surface of the photoreceptor. In this exemplary image conditioning system, a vacuum source (not shown) is also provided and coupled to the interior of the roller for creating an airflow through the porous roller body to draw liquid from the surface of the photoreceptor, thereby increasing the percentage of toner solids in the developed image.

In operation, roller (18a,18b,18c,18d) rotates against the liquid image on belt 100 such that the porous body of roller (18a,18b,18c,18d) absorbs excess liquid from the surface of the image through the pores and perforations of the roller skin covering. The vacuum source, typically located along one end of a central cavity, draws liquid through the roller skin to a central cavity for depositing the liquid in a receptacle or some other location which permits either disposal or recirculation of the liquid carrier. The porous roller (18a,18b,18c,18d) is thus continuously discharged of excess liquid to provide continuous removal of liquid from the image on belt 100. It will be recognized by one of skill in the art that the vacuum assisted liquid absorbing roller described hereinabove may also find useful application in an embodiment in which the image conditioning system is provided in the form of a belt, whereby excess liquid carrier is absorbed through an absorbent foam layer in the belt, as described in U.S. Pat. Nos. 4,299,902 and 4,258,115.

After image conditioning of the first developed image, the image on belt 100 is advanced to a lamp (34a,34b,34c,34d) where any residual charge left on the photoreceptive surface is extinguished by flooding the photoconductive surface with light from lamp (34a,34b,34c,34d). Thereafter, imaging and development are repeated for subsequent color separations by first recharging and reexposing the belt 100, whereby color image bitmap information is superimposed over the previous developed latent image. Preferably, for each subsequent exposure an adaptive exposure processor is employed that modulates the exposure level of the raster output scanner (ROS) for a given pixel as a function of the toner previously developed at the pixel site, thereby allowing toner layers to be made independent of each other. The reexposed image is next advanced through a development station and subsequently through an image conditioning station and each step is repeated as previously described to create a multilayer image made up of black, yellow, magenta, and cyan toner particles as provided via each developing station 103a, 103b, 103c and 103d. It should be evident to one skilled in the art that the color of toner at each development station could be in a different arrangement.

After the multilayer image is created on the photoreceptor, it is advanced to an intermediate transfer station where charging device 111 generates a charge for electrostatically transferring the image from the photoreceptor 100 to an intermediate transfer member 110. The intermediate member 110 may be in the form of either a rigid roll or an endless belt, as shown in the FIG. 6, having a path defined by a plurality of rollers in contact with the inner surface thereof. The intermediate member preferably comprises a multilayer structure comprising a base layer having a thickness greater than about 25 microns and a resistivity of about 106 ohm-cm and insulating top layer having a thickness less than 10 micron, a dielectric constant of approximately 10, and a resistivity of about $10^{11}$ ohm-cm. The top layer also has a toner release surface. It is also preferred that both layers have a similar hardness of less than about 60 durometer. The intermediate transfer member is typically dimensionally stable in nature for providing uniform image deposition which results in a controlled image transfer gap and better image registration.

The multilayer image on the intermediate transfer member 110 may be image conditioned in a manner similar to the image conditioning described hereinabove with respect to the developed image on the photoreceptor 100 by means of a roller 120 which conditions the image by reducing fluid content while inhibiting the departure of toner particles from the image as well as compacting the toner image. Preferably, roller 120 conditions the multilayer image so that the image has a toner composition of more than 50 percent solids. In addition, the multilayer image present on the surface of the intermediate member may be transformed into a tackified or molten state by heat, as may be provided by a heating element 32. More specifically, heating element 32 heats both the external wall of the intermediate member and generally maintains the outer wall of member 110 at a temperature sufficient to cause the toner particles present on the surface to melt, due to the mass and thermal conductivity of the intermediate member. The toner particles on the surface maintain the position in which they were deposited on the outer surface of member 110, so as not to alter the image pattern which they represent while softening and coalescing due to the application of heat from the exterior of member 110. Thereafter, the intermediate transfer member continues to advance in the direction of arrow 22 to a transfix nip 34 where the tackified toner particle image is transferred, and bonded, to a recording sheet 26 with limited wicking thereby. At the transfix nip 34, the toner particles are forced into contact with the surface of recording sheet 26 by a normal force applied through backup pressure roll 36. Some of the 24 advantages provided by the use of an intermediate transfer member include reduced heating of the recording sheet as a result of the toner or marking particles being premelted on the intermediate, as well as the elimination of an electrostatic transfer device for transferring charged particles to a recording sheet. Also because of the lower fuse temperature there is less paper curl.

After the developed image is transferred to intermediate member 110, residual liquid developer material may remain on the photoconductive surface of belt 100. A cleaning station 31 is therefore provided, including a roller formed of any appropriate synthetic resin which may be driven in a direction opposite to the direction of movement of belt 100, to scrub the photoconductive surface clean It will be understood, however, that a number of photoconductor cleaning devices exist in the art, any of which would be suitable for use with the present invention. In addition, any residual charge left on the photoconductive surface may be extinguished by flooding the photoconductive surface with light from lamp 34d in preparation for a subsequent successive imaging cycle. In this way, successive electrostatic latent images may be developed.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated.

EXAMPLE 1

To prepare the base layer, a carbon filled polycarbonate of the STATCON™ family was extruded at Mobay Chemical Company utilizing ICI materials. Some of the properties of this material were surface roughness of about 3 to 5 microinches, wear rate of about 0.019 g/1000 cycles using taber abrasion, resistivity of about $10^9$ ohm-cm, and modulus of about 300,000 PSI. This thin film material was 75 microns in thickness. The polycarbonate base layer was seamed using a puzzle cut seam and impulse welding. The seam was then covered with a seamed top layer of TEDLAR™ containing titanium dioxide. The top layer seam and the base layer seam were offset within one inch. This top layer of TEDLAR™/TiO$_2$ was 25 microns in thickness and was adhered to the polycarbonate with V29 adhesive applied by Flexcon.

EXAMPLE 2

Another sample was prepared as in Example 1 except that the top layer was composed with TEDLAR™ with no titanium dioxide.

COMPARATIVE EXAMPLE 1

The polycarbonate base layer was prepared as described in Example 1. The adhesive layer and top layer were absent. The seam strength was 17 lbs/in.

ADDITIONAL EXAMPLES

In other samples, several adhesives were used to laminate the top layer to the carbon filled polycarbonate base layer. The adhesives tried were Lord 7975/7276, Dunmore TF063203, Lord 7000/7212, Lord 7000/7200 and Lord 7924A/B. These adhesives gave increased adhesion strength (13.6 lbs/in) as compared to the benchmark V29 adhesive (3.6 lbs/in) used in Examples 1 and 2.

The pull strength and flex life of the samples of Examples 1 and 2 were improved over the sample of Comparative Example 1. The seam heights of Examples 1 and 2 were also reduced due to the offset seams as compared with a sample where both seams are aligned directly on top of one another. Thus, the present invention in embodiments showed increased seam strength, decreased seam height, and interlayer adhesion strength improvements of about 4 times.

Other modifications of the present invention may occur to those skilled in the art based upon a reading of the present disclosure and these modifications are intended to be included within the scope of the present invention.

What is claimed is:

1. A member comprising: a base layer having a seam and a top layer having a seam, an adhesive layer between the base layer and the top layer, wherein the base layer seam is discontinuously offset from the top layer seam.

2. The member of claim 1, wherein the adhesive layer is seamed, wherein the adhesive layer seam is discontinuously offset from the top layer seam and the bottom layer seam.

3. The member of claim 1, wherein the base layer is comprised of polycarbonate.

4. The member of claim 1, wherein the top layer is comprised of polyvinyl fluoride.

5. The member of claim 1, wherein the member has two parallel edges and the base layer seam has an oblique angle with respect to the two edges.

6. The member of claim 1, wherein the member has two parallel edges and the top layer seam has an oblique angle with respect to the two edges.

7. The member of claim 1, wherein the difference in thickness between the top layer seam and the unseamed portion of the top layer is less than about 100 microns and the difference in thickness between the base layer seam and the unseamed portion of the base layer is less than about 100 microns.

8. The member of claim 1, wherein the member is an endless belt.

9. The member of claim 1, further comprising electrical property regulating particles disposed in only the base layer.

10. The member of claim 1, further comprising electrical property regulating particles disposed in both the base layer and the top layer.

11. The member of claim 1, wherein the member has a charge relaxation time of less than about $2\times10^2$ seconds.

12. The member of claim 1, further comprising electrical property regulating particles disposed in the base layer, the adhesive layer, and the top layer.

13. The member of claim 1, wherein the top layer has a surface energy ranging from about 17 to about 37 dyn/cm.

14. A member comprising:
(a) a base layer having a seam;
(b) a first adhesive layer;
(c) an intermediate layer having a seam;
(d) a second adhesive layer; and
(e) a top layer having a seam, wherein the intermediate layer seam is discontinuously offset from both the base layer seam and the top layer seam.

15. The member of claim 14, wherein the first adhesive layer is seed and the second adhesive layer is seamed, wherein the first adhesive layer seam and the second adhesive layer seam are discontinuously offset from one another and from the base layer seam, the intermediate layer seam, and the top layer seam.

* * * * *